US011618827B2

(12) United States Patent
Le Roux et al.

(10) Patent No.: US 11,618,827 B2
(45) Date of Patent: Apr. 4, 2023

(54) METHOD FOR PREPARING A COMPOSITION COMPRISING FUNCTIONALISED MINERAL PARTICLES AND CORRESPONDING COMPOSITION

(71) Applicants: CENTRE NATIONAL DE LA RECHERCHE SCIENTIFIQUE (C.N.R.S.), Paris (FR); UNIVERSITE PAUL SABATIER TOULOUSE III, Toulouse (FR)

(72) Inventors: Christophe Le Roux, Avignonet-Lauragais (FR); Francois Martin, Sainte Foy d'Aigrefeuille (FR); Pierre Micoud, Peyssies (FR); Angela Dumas, Pechabou (FR)

(73) Assignees: CENTRE NATIONAL DE LA RECHERCHE SCIENTIFIQUE (C.N.R.S.), Paris (FR); UNIVERSITE PAUL SABATIER TOULOUSE III, Toulouse (FR)

( * ) Notice: Subject to any disclaimer, the term of this patent is extended or adjusted under 35 U.S.C. 154(b) by 0 days.

(21) Appl. No.: 17/655,717

(22) Filed: Mar. 21, 2022

(65) Prior Publication Data
US 2022/0220316 A1 Jul. 14, 2022

Related U.S. Application Data

(63) Continuation of application No. 14/900,901, filed as application No. PCT/FR2014/051636 on Jun. 26, 2014, now Pat. No. 11,312,863.

(30) Foreign Application Priority Data

Jun. 27, 2013 (FR) ..................................... 13.56230

(51) Int. Cl.
C09C 1/30 (2006.01)
C01B 33/44 (2006.01)
C09C 1/00 (2006.01)

(52) U.S. Cl.
CPC ............ C09C 1/3081 (2013.01); C01B 33/44 (2013.01); C09C 1/0081 (2013.01);
(Continued)

(58) Field of Classification Search
None
See application file for complete search history.

(56) References Cited

U.S. PATENT DOCUMENTS

2005/0089656 A1 4/2005 Shiina
2005/0215693 A1 9/2005 Wang et al.
(Continued)

FOREIGN PATENT DOCUMENTS

EP 2 407 425 A1 1/2012
JP 10-69577 A 3/1998
(Continued)

OTHER PUBLICATIONS

Takahashi N et al.: "Anion exchangeable layered silicates modified with ionic liquids on the interlayer surface", Chemistry of Materials 20100608 American Chemical Society USA, vol. 22, No. 11, Jun. 8, 2010 (Jun. 8, 2010), pp. 3340-3348, XP002721226, p. 3342, figure 2, p. 3342, "Experimental section".
(Continued)

Primary Examiner — Ronak C Patel
(74) Attorney, Agent, or Firm — Nixon & Vanderhye

(57) ABSTRACT

A method for preparing a composition including mineral particles functionalized by at least one organic group and having a specific surface defined according to the BET method greater than 500 m²/g, involves: —choosing a phyllosilicate composition, including mineral particles hav-
(Continued)

ing a thickness of less than 100 nm, a largest dimension of less than 10 μm and belonging to the family of lamellar silicates; —choosing at least one functionalizing agent, from the group formed from the oxysilanes and oxygermanes having at least one organic group, —bringing the phyllosilicate composition into contact with a functionalizing solution including the functionalizing agent, so as to obtain a phyllosilicate composition including mineral particles functionalized by the organic group, while choosing the organic group from the group formed from the cationic heteroaryl groups, the quaternary ammonium groups and the salts of same. The phyllosilicate composition obtained by the method is also described.

11 Claims, 4 Drawing Sheets

(52) U.S. Cl.
CPC ...... *C01P 2002/22* (2013.01); *C01P 2002/72* (2013.01); *C01P 2004/04* (2013.01); *C01P 2004/20* (2013.01); *C01P 2004/61* (2013.01); *C01P 2004/64* (2013.01); *C01P 2006/12* (2013.01)

(56) References Cited

U.S. PATENT DOCUMENTS

| | | |
|---|---|---|
| 2005/0250931 A1 | 11/2005 | Takagi |
| 2009/0261294 A1 | 10/2009 | Martin et al. |
| 2010/0036029 A1 | 2/2010 | Yamaguchi et al. |
| 2010/0076133 A1 | 3/2010 | Yamaguchi |
| 2012/0115009 A1 | 5/2012 | Okuno et al. |
| 2013/0035417 A1 | 2/2013 | Villard et al. |
| 2013/0146143 A1 | 6/2013 | Maruyama |
| 2013/0197137 A1 | 8/2013 | Norwig et al. |
| 2013/0289215 A1 | 10/2013 | Roux et al. |

FOREIGN PATENT DOCUMENTS

| | | |
|---|---|---|
| JP | 2009-263539 A | 11/2009 |
| WO | 2012/085239 A1 | 6/2012 |

OTHER PUBLICATIONS

Kim N H et al.: "Modification of cationic nanoclays with ionic liquids", Microporous and Mesoporous Materials, Elsevier Science Publishing, New York, US, vol. 96, No. 1-3, Nov. 26, 2006 (Nov. 26, 2006), pp. 29-35, XP028038780, ISSN: 1387-1811, [retrieved on Nov. 26, 2006] abstract * p. 29.

Karin E Chabrol et al. "Functionalization of synthetic talc-like phyllosilicates by alkoxyorganosilane grafting", Journal of Materials Chemistry, vol. 20, No. 43, Nov. 21, 2010 (Nov. 21, 2010), pp. 9695-9706, XP002683079, abstract * p. 9697, colonne de droite, "2.4. Grafting step".

Turhan Y et al.: "Characterization and adsorption properties of chemically modified sepiolite", Industrial and Engineering Chemistry Research 20080319 American Chemical Society US, vol. 47, No. 6, Mar. 19, 2008 (Mar. 19, 2008), pp. 1883-1895, XP002721227, DOI: 10.1021/IE070506R abstract p. 1884, Surface modification of sepiolite coupling agent.

Sales J A A et al.: "Some features associated with organosilane groups grafted by the sol-gel process onto synthetic talc-like phyllosilicate", Journal of Colloid and Interface Science, Academic Press, New York, NY, US, vol. 297, No. 1, May 1, 2006 (May 1, 2006), pp. 95-103, XP024909735, ISSN: 0021-9797, DOI: 10.1016/J.JCIS.2005.10.019 [retrieved on May 1, 2006] the whole document.

International Search Report, dated Oct. 1, 2014, from corresponding PCT application.

METHOD FOR PREPARING A COMPOSITION COMPRISING FUNCTIONALISED MINERAL PARTICLES AND CORRESPONDING COMPOSITION

CROSS-REFERENCE TO RELATED APPLICATIONS

This application is a continuation of U.S. Ser. No. 14/900,901 filed Dec. 22, 2015, which was a national stage application, filed under 35 U.S.C. § 371, of International Patent Application No. PCT/FR2014/051636 filed Jun. 26, 2014, which claims priority to FR 13.56230 filed Jun. 27, 2013. Each of the previously noted applications is hereby incorporated by reference in their entirety.

The invention relates to a method for preparing a composition comprising mineral particles functionalised by at least one organic group, and to a composition comprising mineral particles functionalised by at least one organic group.

Many minerals such as borates or silicates are used in various industrial fields.

Natural talc, for example, is a hydroxylated magnesium silicate of the formula $Si_4Mg_3O_{10}(OH)_2$ belonging to the phyllosilicate family. The phyllosilicates are composed of an irregular stack of elementary lamellae of crystalline structure, the number of which varies from several units to several tens of units. Among the phyllosilicates (lamellar silicates), the group comprising especially talc, mica and montmorillonite is characterized by the fact that each elementary lamella is constituted by the association of two tetrahedral layers situated on either side of an octahedral layer. This group corresponds to the 2:1 phyllosilicates, which include especially the smectites. In view of their structure, the 2:1 phyllosilicates are also described as being of the T.O.T. (tetrahedron-octahedron-tetrahedron) type.

The octahedral layer of the 2:1 phyllosilicates is formed of two planes of $O^{2-}$ and $OH^-$ ions (in the molar proportion $O^{2-}/OH^-$ of 2/1). On either side of this middle layer there are two-dimensional lattices of tetrahedrons, of which one of the vertices is occupied by an oxygen of the octahedral layer, while the other three are occupied by substantially coplanar oxygens.

Phyllosilicate mineral particles, such as talc, are used in the form of fine particles in many industrial sectors, for example: rubber, thermoplastics, paper, paints, pharmaceuticals, cosmetics, or also phytosanitary products. They are used as an inert filler (for their chemical stability or also to dilute more expensive active compounds) or as functional fillers (for example to enhance the mechanical properties of some materials). When they are introduced into such materials, their dispersion frequently presents difficulties, especially because phyllosilicate mineral particles have a small particle size. The finest mineral particles in fact tend to agglomerate, reducing the effects that their use is expected to have on the final properties of the materials.

In order to remedy these problems, the invention aims to propose a method for preparing a composition comprising mineral particles functionalised by at least one organic group.

The invention aims also to propose such a method which can be carried out simply and quickly and which is compatible with the constraints of industrial exploitation.

The invention aims also to propose a composition comprising mineral particles functionalised by at least one organic group.

The invention aims also to propose compositions comprising synthetic phyllosilicate mineral particles which can be used as a replacement for natural talc compositions.

To that end, the invention relates to a method for preparing a composition comprising mineral particles functionalised by at least one organic group and having a specific surface area determined according to the BET method—standard AFNOR X 11—621 and 622—of greater than 500 m²/g, wherein:

there is chosen a composition, named the phyllosilicate composition, comprising mineral particles belonging to the family of the lamellar silicates, said mineral particles having a thickness of less than 100 nm and a largest dimension of less than 10 μm;

there is chosen at least one compound, named the functionalising agent, from the group formed of oxysilanes and oxygermanes having at least one organic group;

said phyllosilicate composition is brought into contact with a solution, named the functionalising solution, comprising said functionalising agent, so as to obtain a phyllosilicate composition comprising mineral particles functionalised by said organic group, characterised in that the organic group is chosen from the group formed of cationic heteroaryl groups, quaternary ammonium groups and their salts.

The inventors have found, surprisingly, that it is possible by means of a method according to the invention, in which phyllosilicate mineral particles are brought into contact with at least one such functionalised oxysilane and/or with at least one such functionalised oxygermane, to obtain functionalised mineral particles whose tendency to agglomerate is reduced considerably.

Throughout the text, "heteroaryl group" is understood as meaning any group that contains one or more aromatic rings having from 5 to 18 ring members and that contains from 1 to 6 heteroatoms (chosen from oxygen, nitrogen and sulfur).

The cationic heteroaryl groups which can be carried by said oxysilanes and oxygermanes are, for example, imidazolium groups, pyridinium groups or also indolinium groups.

Throughout the text, "quaternary ammonium group" is understood as meaning any group of the formula $N^+R_{10}R_{11}R_{12}R_{13}$ wherein $R_{10}$, $R_{11}$, $R_{12}$ and $R_{13}$ are identical or different and are chosen from a hydrogen atom and linear or branched alkyl groups containing from 1 to 18 carbon atom(s).

Advantageously, in a variant of a method according to the invention, the mineral particles are chosen from the group of the non-swelling 2:1 phyllosilicates. Some of the non-swelling 2:1 phyllosilicates (for example mica) have a cation in the interfoliar space, and others (for example talc) have an interfoliar void and do not permit interfoliar cation exchange. "Interfoliar void" is understood as meaning the fact that such non-swelling 2:1 phyllosilicates are free of any interfoliar cation, of any interfoliar anion and of any interfoliar molecule—especially water molecule.

Advantageously and according to the invention, said functionalising agent has the chemical formula:

(I)

wherein:
A denotes said organic group,
T is chosen from the group formed of silicon and germanium, and
R1, R2 and R3 are identical or different and are chosen from the group formed of hydrogen and linear alkyl groups containing from 1 to 3 carbon atom(s).

Advantageously and according to the invention, said organic group (organic group A) has the chemical formula:

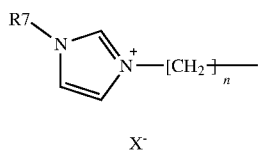

wherein:
R7 is chosen from linear or branched alkyl groups containing from 1 to 18 carbon atom(s),
n is an integer from 3 to 11,
$X^-$ is an anion chosen from the group formed of the bromide ion, the iodide ion, the chloride ion, the trifluoromethanesulfonate anion, the acetate anion, the nitrate anion and the nitrite anion.

Advantageously and according to the invention, R7 is chosen from the group formed of linear alkyl groups and branched alkyl groups containing from 1 to 18 carbon atom(s), especially from 1 to 10 carbon atom(s) and in particular from 1 to 4 carbon atom(s).

Advantageously, A is a cationic group which is soluble in an aqueous medium, A contributes towards conferring a water-soluble nature upon said oxysilane and/or said oxygermane.

More particularly, R1, R2 and R3 each represent a methyl (—CH$_3$) or ethyl (—CH$_2$—CH$_3$) group. Accordingly, in a particularly advantageous variant of a method according to the invention, said oxysilane has the formula:

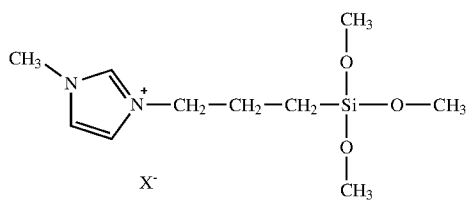

wherein $X^-$ is an anion wherein X is chosen from the group formed of chlorine, iodine and bromine. In this case, the oxysilane (a trialkoxysilane) is a 1-(trimethoxy-silyl-propyl)-3-methyl-imidazolium salt.

Advantageously and according to the invention, said functionalising agent is chosen from the group formed of oxysilanes and oxygermanes which are soluble in an aqueous medium. In particular, advantageously and according to the invention, said oxysilanes and said oxygermanes are at least partially soluble in water and optionally soluble in any proportions in water.

Advantageously and according to the invention, said functionalising solution is an aqueous solution.

Accordingly, a method according to the invention does not require the use of organic solvents which are dangerous to humans or to the environment but can be carried out wholly advantageously in an aqueous medium.

Throughout the text, "aqueous medium" denotes any liquid medium comprising water and optionally one or more other solvent(s) that are miscible with water. It can be, for example, an aqueous-alcoholic medium comprising water and ethanol.

Advantageously and according to the invention, there is chosen a phyllosilicate composition comprising mineral particles from the group formed of talcs, pyrophyllites, micas (such as muscovite, paragonite or also illite), smectites (such as montmorillonite, saponite, hectorite or also beidellite), kaolinites, serpentinites, chlorites and mixtures thereof.

Advantageously and according to the invention, said phyllosilicate composition comprises mineral particles having the chemical formula:

$(Si_xGe_{1-x})_4M_3O_{10}(OH)_2$

Si denoting silicon,
Ge denoting germanium,
x being a real number of the interval [0;1], and
M denoting a metal (metal atom), and especially M denoting at least one divalent metal having the formula $Mg_{y(1)}Co_{y(2)}Zn_{y(3)}Cu_{y(4)}Mn_{y(5)}Fe_{y(6)}Ni_{y(7)}Cr_{y(8)}$; each y(i) representing a real number of the interval [0;1], and such that $$\sum_{i=1}^{8} y(i) = 1.$$

In a particularly advantageous variant of a method according to the invention, said phyllosilicate composition that is used comprises particles of talc having the chemical formula $Si_4Mg_3O_{10}(OH)_2$.

Advantageously and according to the invention, said mineral particles have a thickness of less than 100 nm and a largest dimension of less than 10 μm. Advantageously and according to the invention, said particles have a thickness of from 1 nm to 150 nm, in particular from 5 nm to 50 nm, and a largest dimension of from 20 nm to 10 μm.

Throughout the text, "thickness" of the silicate mineral particles denotes the smallest dimension of said particles, that is to say the dimension of said particles in direction c of the crystal lattice of said silicate mineral particles.

Throughout the text, "largest dimension" of the silicate mineral particles denotes the largest dimension of said particles in the plane (a, b) of the crystal lattice of said silicate mineral particles.

The thickness and the largest dimension of the silicate mineral particles are measured by observation by scanning electron microscopy (SEM) or by transmission electron microscopy (TEM).

In a method according to the invention, the duration of the functionalising step during which said phyllosilicate composition is brought into contact with at least one functionalising agent (oxysilane and/or oxygermane), the concentration of each functionalising agent in the functionalising solution, and the temperature at which this step takes place are adapted to permit fixing of said organic group to the phyllosilicate mineral particles of said phyllosilicate composition, and therefore functionalisation of the phyllosilicate composition. Advantageously and according to the invention, said predetermined duration, during which said phyllosilicate composition is brought into contact with the functionalising solution, is from 5 seconds to 30 days and in particular from 5 minutes to 2 hours.

Advantageously and according to the invention, the concentration of oxysilane(s) and/or oxygermane(s) present in the functionalising solution is from 0.005 mol/l to the saturation concentration thereof in the medium. The concentration of oxysilane(s) and/or oxygermane(s) present in the functionalising solution is, for example, from 0.01 mol/l to 3 mol/l.

Advantageously and according to the invention, the functionalising agent(s) and the phyllosilicate mineral particles are brought into contact in the functionalising solution in such a manner that the molar ratio between the functionalising agent(s) and the phyllosilicate mineral particles (number of moles of oxysilane(s) and/or oxygermane(s)/number of moles of phyllosilicate mineral particles) is from 0.01 to 0.5, especially from 0.05 to 0.3.

Furthermore, advantageously and according to the invention, the functionalising step takes place at a temperature of from 5° C. to 100° C. The contacting which takes place in this step of a method according to the invention can be carried out, for example, at ambient temperature (from 20° C. to 25° C.) or also at a temperature slightly above ambient temperature, for example from 25° C. to 40° C.

The functionalising step can be carried out with or without stirring. In particular, advantageously and according to the invention, said phyllosilicate composition is brought into contact with the functionalising solution with stirring, for example with magnetic stirring by means of a magnetic stirrer.

At the end of the functionalising step of a method according to the invention, the functionalised phyllosilicate composition obtained can be recovered by removing the aqueous functionalising solution. The aqueous functionalising solution can be removed, for example, after spontaneous decantation of said functionalised phyllosilicate composition (by allowing the solution to rest) and removal of the supernatant solution or also by centrifugation of the functionalising solution comprising said functionalised phyllosilicate composition obtained. The functionalised phyllosilicate composition comprising functionalised phyllosilicate mineral particles that is recovered can then be rinsed so as to remove the residual oxysilanes and/or oxygermanes. Accordingly, advantageously, in a method according to the invention, following the functionalising step, the functionalised phyllosilicate mineral particles obtained are rinsed with an aqueous solution which is at least substantially free of oxysilanes and oxygermanes.

At the end of the functionalising step of a method according to the invention, the functionalised phyllosilicate composition obtained can be stored or used as it is, in the form of a gel or aqueous suspension, or it can also be dried so as to remove at least in part the aqueous solution, especially water, still present. Advantageously and according to the invention, the functionalised phyllosilicate mineral particles obtained are dried after functionalisation, and before or after optional rinsing. Drying can be carried out by any drying means which allows the aqueous solution to be removed. Drying can, for example, be carried out directly in an oven (for example at a temperature of approximately 100° C.), by spraying, by drying by means of microwave irradiation, or also by lyophilisation.

In addition, it is possible to repeat at least once said functionalising step in which the phyllosilicate composition is brought into contact with the functionalising solution. In this manner it is possible to modify to a greater or lesser extent the rate of functionalisation (or grafting rate) of the phyllosilicate composition.

After the mineral particles of the phyllosilicate composition have been functionalised, it is also possible to carry out an at least partial exchange of the anion $X^-$. Accordingly, advantageously and according to the invention, after said phyllosilicate composition has been brought into contact with the functionalising solution, there is carried out an at least partial exchange of the anion $X^-$ by at least one anionic species which is different from $X^-$ and is chosen from the group formed of the bromide ion $Br^-$, the iodide ion $I^-$, the chloride ion, the bis(trifluoromethanesulfonyl)amide anion, the trifluoromethanesulfonate anion, the hexafluorophosphate anion, the tetrafluoroborate anion, the acetate anion, the nitrate anion $NO_3^-$ and the nitrite anion $NO_2^-$. Such an exchange by metathesis allows the more or less hydrophilic or hydrophobic nature of the functionalised mineral particles that are prepared to be modulated in a customised manner. The bis(trifluoromethanesulfonyl)amide anion has, for example, a highly hydrophobic nature.

Furthermore, after the mineral particles of the phyllosilicate composition have been functionalised, it is possible in particular to carry out an at least partial exchange of the anion $X^-$, when X is chosen from the group formed of chlorine, bromine and iodine, by bringing said functionalised mineral particles into contact with a solution comprising a metal salt, in particular a silver salt ($AgNO_3$, for example). Advantageously and according to the invention, after said phyllosilicate composition has been brought into contact with the functionalising solution, there is carried out an at least partial exchange of the anion $X^-$, when X is chosen from the group formed of chlorine, bromine and iodine, by adding at least one silver salt, in particular a water-soluble silver salt. In this manner, by allowing the solution comprising said functionalised mineral particles and said silver salt to age, the formation of nanometric particles of silver associated with the mineral particles is observed, the nanometric particles having the advantage of having bactericidal properties.

Advantageously and according to the invention, said phyllosilicate mineral particles are prepared by a hydrothermal treatment of a hydrogel precursor containing silicon and/or germanium and a metal, said hydrogel precursor comprising particles of the formula $(Si_xGe_{1-x})_4 \, M_3 \, O_{11}, n'H_2O$, wherein:

Si denotes silicon,
Ge denotes germanium,
x is a real number of the interval [0; 1],
M denotes at least one—especially one—metal atom,
n' relates to a number of molecule(s) of water associated with said hydrogel.

In particular, the metal M is chosen from the group formed of magnesium, cobalt, zinc, copper, manganese, iron, nickel and chromium.

According to another formulation, the hydrogel precursor comprises:

4 silicon and/or germanium atoms according to the following chemical formula: 4 $(Si_xGe_{1-x})$, x being a real number of the interval [0; 1],
3 atoms of metal M, M denoting at least one divalent metal having the formula $Mg_{y(1)}Co_{y(2)}Zn_{y(3)}Cu_{y(4)}Mn_{y(5)}Fe_{y(6)}Ni_{y(7)}Cr_{y(8)}$, wherein each y(i) represents a real number of the interval [0; 1], and such that $$\sum_{i=1}^{8} y(i) = 1,$$

(10−ε) oxygen atoms ((10−ε) O), ε being a real number of the interval [0; 10[, (2+ε) hydroxyl groups ((2+ε) (OH)), ε being a real number of the interval [0; 10[.

The hydrogel precursor therefore corresponds to the following chemical formula (II):

$$4(Si_xGe_{1-x})3M((10-\varepsilon)O)((2+\varepsilon)(OH)) \quad (II).$$

Water molecules can further be bonded to the particles of the hydrogel precursor. These are water molecules adsorbed or physisorbed onto the particles of hydrogel precursor and not constituent water molecules that are usually present in the interfoliar spaces of certain phyllosilicate particles.

Throughout the text, "hydrothermal treatment under pressure" denotes any treatment carried out in a closed receptacle, such as an autoclave, in the presence of water, at a predetermined temperature and at a pressure greater than atmospheric pressure.

The duration of the hydrothermal treatment is adapted to allow said phyllosilicate mineral particles to be obtained, as a function especially of the temperature at which the hydrothermal treatment is carried out. Advantageously and according to the invention, said hydrothermal treatment is carried out for a duration of from 1 second to 60 days, especially from 30 minutes to 24 hours.

Advantageously and according to the invention, the hydrothermal treatment of said hydrogel precursor is carried out in a vessel with a constant volume, for example by means of an autoclave. It can be, for example, an autoclave formed of a nickel-based alloy such as Hastelloy® (marketed by Haynes International, Kokomo, United States) or also an autoclave made of titanium or optionally of steel with an inner lining of polytetrafluoroethylene (PTFE). Such an autoclave can have any capacity, for example a capacity ranging from 200 ml to 50 litres.

The hydrothermal treatment can be carried out with or without mechanical stirring. In a particularly advantageous variant of a method according to the invention, said hydrothermal treatment is carried out with mechanical stirring. There can be used for that purpose, for example, an autoclave equipped with an internal metal propeller.

Advantageously and according to the invention, said hydrothermal treatment is carried out at a pressure of from 0.5 MPa (5 bar) to 20 MPa (200 bar). Advantageously and according to the invention, said hydrothermal treatment is carried out under autogenous pressure, that is to say at a pressure that is at least equal to the saturation vapour pressure of water (pressure at which the vapour phase is in equilibrium with the liquid phase). The autogenous pressure reached in the autoclave during the hydrothermal treatment therefore depends especially on the temperature at which said hydrothermal treatment is carried out, on the volume of the autoclave and on the quantity of water present. It is likewise possible to carry out the hydrothermal treatment at a pressure greater than the saturation vapour pressure of water or greater than the autogenous pressure in the receptacle in which the hydrothermal treatment is taking place. To that end, a gas that is chemically neutral with respect to the hydrothermal reaction is injected into the autoclave or the receptacle in which the hydrothermal treatment is taking place. Such a gas is chosen from the group formed of the inert gases (rare gases), in particular argon, dinitrogen ($N_2$), carbon dioxide and air (compressed air).

Advantageously and according to the invention there is added to the autoclave, with said hydrogel precursor, a quantity of water (preferably of distilled water) which is at least sufficient to create, inside the autoclave brought to the treatment temperature, a saturation vapour atmosphere.

Advantageously and according to the invention, the hydrothermal treatment is carried out using a liquefied hydrogel precursor having a liquid/solid ratio of from 2 to 20, especially from 5 to 15 (the quantity of liquid being expressed in $cm^3$, and the quantity of solid being expressed in grams and denoting the quantity of hydrogel only). If necessary, an appropriate amount of water for achieving that ratio may be added to said liquefied hydrogel precursor.

Advantageously and according to the invention, the hydrogel precursor is prepared by a coprecipitation reaction between:
at least one compound comprising silicon and/or germanium, such as sodium metasilicate or sodium metagermanate or also silicon, and
at least one metal salt, so as to obtain a hydrated hydrogel precursor containing silicon and/or germanium and a metal and containing 4 silicon and/or germanium atoms for 3 atoms of at least one metal M.

Advantageously and according to the invention, said metal salt used for the preparation of the hydrogel precursor is chosen from the metal salts of magnesium, cobalt, zinc, copper, manganese, iron, nickel and/or chromium can be used in a method according to the invention. In particular, advantageously and according to the invention, said metal salt is chosen from the metal chlorides (of the formula $MCl_2$) and the metal acetates (of the formula $M(CH_3COO)_2$) (M being chosen from the group formed of magnesium, cobalt, zinc, copper, manganese, iron, nickel and chromium) and the metal sulfates. Preferably, said metal salt is chosen from $MgCl_2$, $CoCl_2$, $ZnCl_2$, $CuCl_2$, $MnCl_2$, $FeCl_2$, $NiCl_2$, $CrCl_2$ and $Mg(CH_3COO)_2$, $Co(CH_3COO)_2$, $Zn(CH_3COO)_2$, $Cu(CH_3COO)_2$, $Mn(CH_3COO)_2$, $Ni(CH_3COO)_2$ and $Cr(CH_3COO)_2$.

In a variant embodiment according to the invention, the coprecipitation reaction of the hydrogel precursor and/or the hydrothermal treatment of the hydrogel precursor is/are carried out in the presence of a carboxylate salt. It is in particular a carboxylate salt of the formula R8-COOM', wherein:

M' denotes a metal chosen from the group formed of Na and K, and

R8 is chosen from the group formed of H and alkyl groups containing fewer than 5 carbon atoms.

The invention relates also to a composition obtainable by a method according to the invention.

The invention therefore relates also to a composition, named a phyllosilicate composition, comprising mineral particles belonging to the family of the lamellar silicates, characterised in that said mineral particles have:

a thickness of less than 100 nm and a largest dimension of less than 10 μm;

a specific surface area determined according to the BET method—standard AFNOR X 11—621 and 622—of greater than 500 $m^2/g$; and at least one organic group chosen from the group formed of cationic heteroaryl groups, quaternary ammonium groups and their salts.

Advantageously and according to the invention, said phyllosilicate composition comprises mineral particles having the chemical formula:

$$(Si_xGe_{1-x})_4M_3O_{10}(OH)_2$$

Si denoting silicon,
Ge denoting germanium, x being a real number of the interval [0;1], M denoting a metal, and in particular at least one divalent metal having the formula $Mg_{y(1)}Co_{y(2)}Zn_{y(3)}Cu_{y(4)}Mn_{y(5)}Fe_{y(6)}Ni_{y(7)}Cr_{y(8)}$; each y(i) representing a real number of the interval [0;1], and such that $$\sum_{i=1}^{8} y(i) = 1.$$

Advantageously and according to the invention, said mineral particles have a thickness of less than 100 nm and a largest dimension of less than 10 μm.

Advantageously and according to the invention, said mineral particles (that is to say the functionalised mineral particles) have a specific surface area of greater than 500 m²/g, especially greater than 600 m²/g and in particular greater than 700 m²/g.

Advantageously and according to the invention, said functionalised mineral particles comprise from 0.001 millimole to 4 millimoles of said organic group per gram of mineral particles.

The invention relates also to a method for treating a composition comprising synthetic mineral particles and to a composition comprising synthetic mineral particles characterised in combination by all or some of the features mentioned hereinabove or hereinbelow.

Other objects, advantages and features of the invention will become apparent upon reading the description and the examples which follow and which make reference to the accompanying figures.

Figure 1:
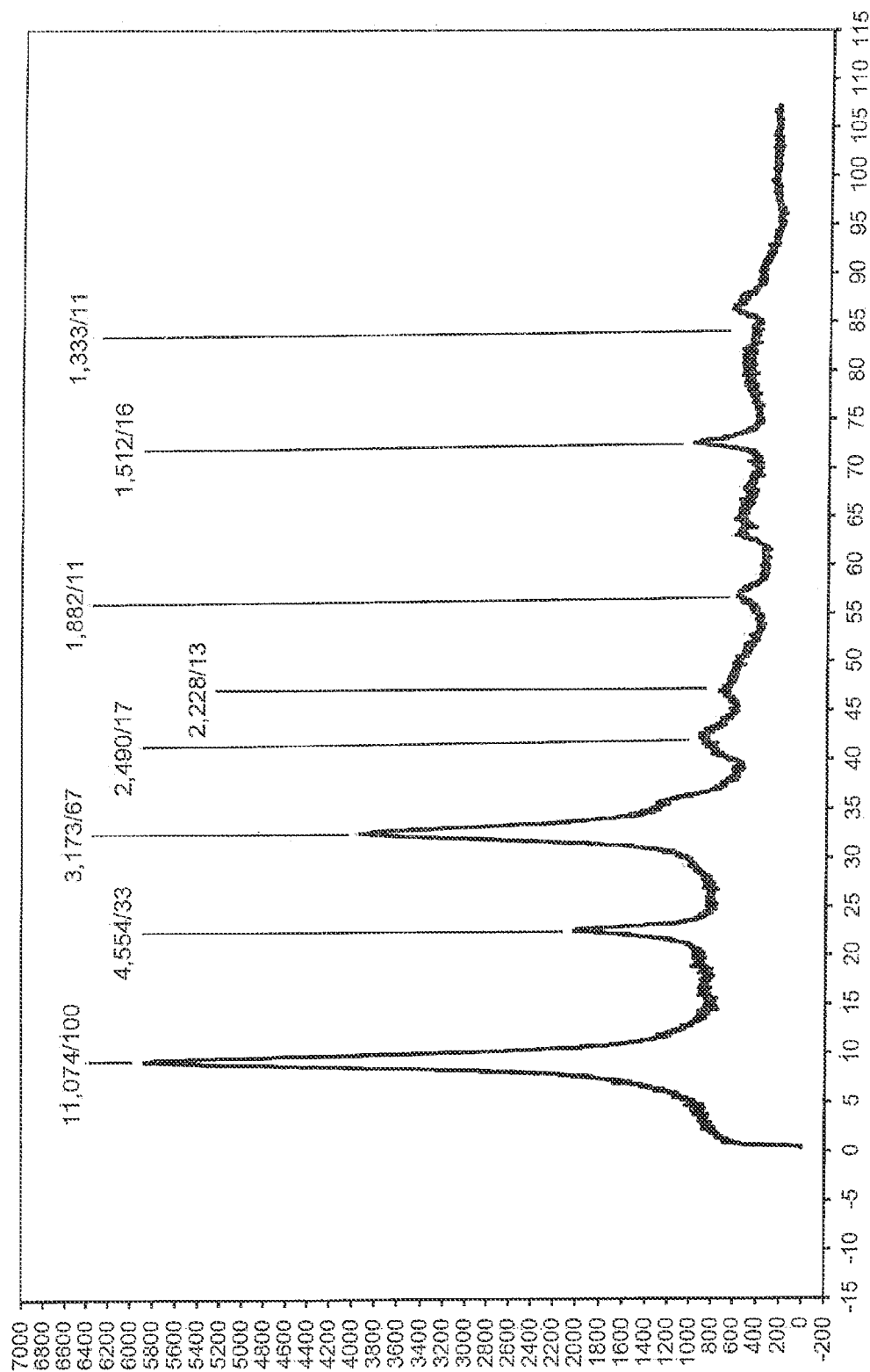
FIG. 1 shows an RX diffractogram of a composition according to the invention on which there is shown the relative intensity of the signal (number of counts per second) as a function of the interplanar spacing in angstroms.

A phyllosilicate composition used in a method according to the invention can be prepared, for example, according to the following synthesis protocol.

A/—General Protocol for Synthesis of a Composition Used in a Method According to the Invention 1/—Preparation of a Hydrogel Precursor Containing Silicon and/or Germanium and a Metal According to a first variant, the hydrogel containing silicon and/or germanium and a metal is prepared by a coprecipitation according to the following reaction equation:

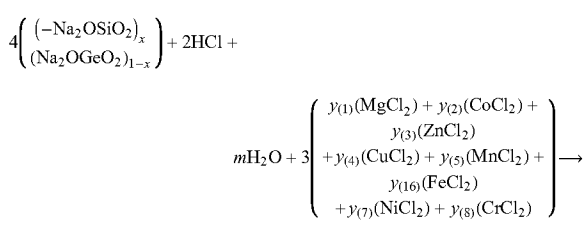

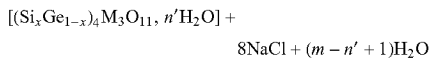

$$8NaCl + (m - n' + 1)H_2O$$

This coprecipitation reaction allows a hydrated hydrogel containing silicon and/or germanium and a metal having the stoichiometry of talc (4 silicon (Si) and/or germanium (Ge) atoms for 3 atoms of said divalent metal M) to be obtained.

It is carried out starting from:
1. an aqueous solution of penta-hydrated sodium metasilicate or an aqueous solution of sodium metagermanate, or a mixture of these two solutions in the molar proportions x:(1−x),
2. a metal chloride solution prepared with one or more metal salts (in the form of hygroscopic crystals) diluted in distilled water, and
3. a 1N hydrochloric acid solution.

The hydrogel containing silicon and/or germanium and a metal is prepared according to the following protocol:
1. the hydrochloric acid solution and the metal chloride solution are mixed,
2. this mixture is added to the sodium metasilicate and/or metagermanate solution; the coprecipitation gel forms instantly,
3. the gel is recovered after centrifugation (at 7000 revolutions/minute for 15 minutes) and removal of the supernatant (sodium chloride solution that has formed),
4. the gel is washed with distilled or osmosed water or with tap water (a minimum of two cycles of washing/centrifugation are necessary).

According to a second variant, the hydrogel containing silicon and/or germanium and a metal can be prepared by a coprecipitation reaction involving, as reagent, at least one compound comprising silicon, at least one dicarboxylate salt of the formula $M(R9-COO)_2$ (R9 being chosen from H and alkyl groups containing fewer than 5 carbon atoms) in the presence of at least one carboxylate salt of the formula R8-COOM', wherein M' denotes a metal chosen from the group formed of Na and K, and R8 is chosen from the group formed of H and alkyl groups containing fewer than 5 carbon atoms.

This coprecipitation reaction allows a hydrated hydrogel containing silicon and/or germanium and a metal having the stoichiometry of talc (4 Si/Ge for 3 M, M having the formula $Mg_{y(1)}Co_{y(2)}Zn_{y(3)}Cu_{y(4)}Mn_{y(5)}Fe_{y(6)}Ni_{y(7)}Cr_{y(8)}$; each y(i) representing a real number of the interval [0;1], and such $$\sum_{i=1}^{8} y(i) = 1$$

to be obtained.

The hydrogel containing silicon and/or germanium and a metal is prepared by a coprecipitation reaction carried out starting from:
1. an aqueous solution of penta-hydrated sodium metasilicate or an aqueous solution of sodium metagermanate, or a mixture of these two solutions in the molar proportions x:(1−x),
2. a solution of dicarboxylate salt(s) prepared with one or more dicarboxylate salt(s) of the formula $M(R9-COO)_2$ diluted in a carboxylic acid, such as acetic acid, and 3. a solution of carboxylate salt(s) prepared with one or more carboxylate salt(s) of the formula R8-COOM' diluted in distilled water.

The hydrogel containing silicon and/or germanium and a metal is prepared according to the following protocol:
1. the sodium metasilicate solution and the solution of carboxylate salt(s) of formula R8-COOM' are mixed,
2. the solution of dicarboxylate salt(s) of the formula M(R9-COO)$_2$ is added quickly thereto; the coprecipitation hydrogel forms instantly.

At the end of this first phase, a hydrated hydrogel containing silicon and/or germanium and a metal—$(Si_xGe_{1-x})_4 M_3O_{11}$, n'H$_2$O—of gelatinous consistency is obtained (optionally in the presence of the carboxylate salt(s) of the formula (e) R8-COOM' and R9-COOM' in the case of the second variant). The gel has thixotropic behaviour, that is to say it passes from a viscous state to a liquid state when it is stirred and then returns to its original state if it is allowed to rest for a sufficient time. The hydrogel precursor containing silicon and/or germanium and a metal therefore also corresponds to formula (II) 4 $(Si_xGe_{1-x})$ 3 M $((10-\varepsilon)$ O) $((2+\varepsilon)$ (OH)), wherein:

x is a real number of the interval [0; 1], and

ε is a real number of the interval [0; 10[.

The gel containing silicon and/or germanium and a metal can also be recovered after centrifugation (for example from 3000 to 15,000 revolutions per minute for from 5 to 60 minutes) and removal of the supernatant, optionally washing with demineralised water (for example two successive washings and centrifugations) and then drying, for example in an oven (60° C., 2 days), by lyophilisation, by spray drying or also by drying with microwave irradiation. The particles containing silicon and/or germanium and a metal of the formula $(Si_xGe_{1-x})_4M_3O_{11}$, n'H$_2$O can thus be stored in the form of a powder with a view to a subsequent hydrothermal treatment. The particles obtained containing silicon and/or germanium and a metal are, if necessary, ground by means of a mortar (for example an agate mortar) in order to obtain a homogeneous powder.

2/—Hydrothermal Treatment of the Gel Containing Silicon and/or Germanium and a Metal The gel containing silicon and/or germanium and a metal as obtained hereinbefore is subjected to a hydrothermal treatment at a temperature of from 150° C. to 600° C., and especially at a temperature of from 150° C. to 400° C.

In order to carry out the hydrothermal treatment:
1. the gel is placed in a reactor (of 400 ml); the water/solid ratio is optionally adjusted by adding water, especially in order to avoid calcination of the solid fraction); in order to avoid any problem of leakage from the reactor, the reactor is filled to ⅔ of its volume,
2. there is optionally added, with stirring, a solution comprising at least one carboxylate salt of the formula R8-COOM', in hydrated or anhydrous form, X denoting a metal chosen from the group formed of Na and K, and R$_2$ being chosen from the group formed of H and alkyl groups containing fewer than 5 carbon atoms,
3. the reactor is placed inside an oven or conduction oven at the reaction temperature (established at from 150° C. to 600° C., in particular from 150° C. to 400° C.) throughout the treatment (from 30 minutes to 60 days).

At the end of this hydrothermal treatment, a colloidal talcose composition comprising phyllosilicate mineral particles, in solution in water, is obtained.

The carboxylate salt optionally present during the hydrothermal treatment can be added at the time said hydrothermal treatment is carried out and/or can be obtained from the precipitation medium of the gel containing silicon and/or germanium and a metal according to the second variant for the preparation of the hydrogel containing silicon and/or germanium and a metal. Carrying out the hydrothermal treatment in the presence of a carboxylate salt allows the reaction of converting the hydrogel containing silicon and/or germanium and a metal into a talcose composition comprising phyllosilicate mineral particles to be improved, especially by accelerating it. In the case where the hydrothermal treatment is carried out in the presence of such a carboxylate salt, a temperature inside the oven or autoclave of from 150° C. to 400° C. is sufficient.

At the end of this hydrothermal treatment, the contents of the reactor are recovered after filtration and/or optionally centrifugation (for example at from 3000 to 15,000 revolutions per minute for from 5 to 60 minutes) and removal of the supernatant. The recovered talcose composition is optionally dried, for example in an oven (60° C., 2 days), by lyophilisation, by spray drying or also by drying with microwave irradiation.

At the end of such a hydrothermal treatment there is obtained a divided solid composition comprising, for example, particles of synthetic talc of the formula $Si_4Mg_3O_{10}(OH)_2$.

B/—Method for Preparing a Composition Comprising Functionalised Mineral Particles According to the Invention The mineral particles as prepared hereinbefore, for example particles of synthetic talc $Si_4Mg_3O_{10}(OH)_2$, are brought into contact with a solution comprising at least one oxysilane and/or at least one oxygermane having at least one organic group chosen from the group formed of cationic heteroaryl groups, quaternary ammonium groups and their salts.

The functionalising agent (oxysilane and/or oxygermane) has the chemical formula:

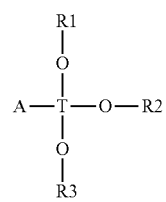

(I)

wherein:

A denotes said organic group rom the group formed of cationic heteroaryl groups, quaternary ammonium groups and their salts, T is chosen from silicon and germanium, and R1, R2 and R3 are identical or different and are chosen from the group formed of hydrogen and linear alkyl groups containing from 1 to 3 carbon atom(s).

The functionalising agent can optionally polymerise in the functionalising solution and be in a small proportion in the following form:

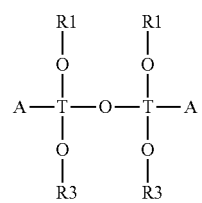

or also in the form of other products of that polymerisation.

To that end:

1. 1 gram of phyllosilicate mineral particles previously dried in an oven is placed in 40 ml of an aqueous solution in which there is dissolved at least one functionalised oxysilane and/or at least one functionalised oxygermane as defined hereinabove, for 1 hour, with stirring, the concentration of that compound in the solution being, for example, 0.015 mol/l, 2. the particles are recovered by centrifuging the solution, for example for 10 minutes at 10,000 revolutions/minute, and removing the supernatant solution, 3. the particles are rinsed one to two times with distilled water, by centrifugation, for example for 10 minutes at 10,000 revolutions/minute, and removal of the supernatant solution each time, so as to remove excess oxysilanes and/or oxygermanes, and 4. the particles obtained are dried, for example by lyophilisation.

In particular, said oxysilane can be a trialkoxysilane which is soluble in an aqueous medium and has the following formula:

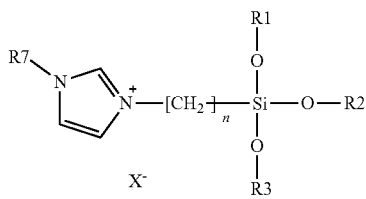

wherein:
  R1, R2 and R3 are identical or different and are chosen from linear alkyl groups containing from 1 to 3 carbon atom(s),
  R7 is chosen from linear alkyl groups containing from 1 to 18 carbon atom(s),
  n is an integer from 1 to 5, and
  $X^-$ is an anion, wherein X is chosen from the group formed of chlorine, iodine and bromine.

It is then possible to carry out an at least partial exchange of the anion $X^-$ by at least one anionic species which is different from $X^-$ and is chosen from the group formed of the bromide ion $Br^-$, the iodide ion $I^-$, the bis-trifluoromethanesulfonamide anion, the trifluoromethanesulfonate anion, the hexafluorophosphate anion, the tetrafluoroborate anion, the acetate anion, the nitrate anion $NO_3^-$ and the nitrite anion $NO_2^-$. Such an exchange by metathesis allows the more or less hydrophilic or hydrophobic nature of the functionalised mineral particles that are prepared to be modulated in a customised manner. It is possible to use, for example, a metal salt such as a silver salt (especially a silver nitrate $AgNO_3$) or a lithium salt (such as lithium bis-trifluoromethanesulfonamide, for example).

C/—Analysis and Structural Characterisation

The size and particle size distribution of the phyllosilicate mineral particles composing them were evaluated by observation by field effect scanning electron microscopy.

It is found that the particle size of the elementary particles varies from 20 nm to 100 nm. In particular, the phyllosilicate mineral particles have a thickness of less than 100 nm and a largest dimension of less than 10 μm.

Moreover, measurements of the specific surface area (surface area of the particles relative to a unit of mass) of the mineral particles that were prepared, determined according to the BET method by the quantity of nitrogen adsorbed at the surface of said particles so as to form a monomolecular layer covering said surface completely (measurement according to the BET method, standard AFNOR X 11—621 and 622) were carried out. It is found that the specific surface area of the phyllosilicate mineral particles contained in a composition obtained by a method according to the invention is approximately 700 $m^2/g$.

Such a specific surface area value, while the specific surface area of a natural talc is approximately 20 $m^2/g$, is indicative not only of a very small particle size and of the lamellar nature of the particles, but also of the divided or deagglomerated state of the particles, and especially of an exfoliation of the elementary lamellae forming said particles.

EXAMPLE 1

A suspension comprising particles of talc of the formula $Si_4Mg_3O_{10}(OH)_2$ comprising 100 g of talc gel (that is to say 10 g of dry talc) in 300 ml of water is prepared. The suspension is stirred magnetically and at the same time subjected to ultrasound until a suspension having a homogeneous consistency and a milky appearance is obtained.

The functionalised oxysilane is then added to the suspension comprising talc particles. 1 g of 1-(trimethoxy-silyl-propyl)-3-methyl-imidazolium chloride previously diluted in 20 ml of water is added. The oxysilane and the talc particles are thus brought into contact in the functionalising solution so that the molar ratio between the oxysilane and the talc particles is 0.13. Magnetic stirring and sonication are maintained for 10 minutes.

1-(Trimethoxy-silyl-propyl)-3-methyl-imidazolium chloride has the following structural chemical formula:

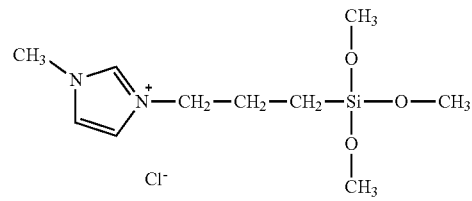

The suspension is then centrifuged at 10,000 revolutions/minute for 10 minutes, and the supernatant solution composed of water and excess functionalised oxysilane.

The functionalised talcose composition that is recovered is then subjected to washing with demineralised water and centrifugation.

Finally, the talcose composition recovered after centrifugation is dried by lyophilisation (trap at −52° C. and vacuum of 0.087 mbar).

The talcose composition obtained comprises 0.03 mmole of oxysilane per gram of talc (measurement carried out by elemental analysis).

The specific surface area of the talcose composition obtained, measured according to the BET method, is 764 $m^2/g$.

The X-ray diffractogram of the talc composition so obtained is shown in FIG. 1. The X-ray diffractogram of this talcose composition has diffraction peaks corresponding to the diffraction peaks of the functionalised talc, and in particular the following characteristic diffraction peaks:
  a plane (001) situated at a distance of 11.074 Å (I=100);
  a plane (020) situated at a distance of 4.554 Å (I=33);

a plane (003) situated at a distance of 3.173 Å (I=67);
a plane (060) situated at a distance of 1.512 Å (I=16).

Figure 2:
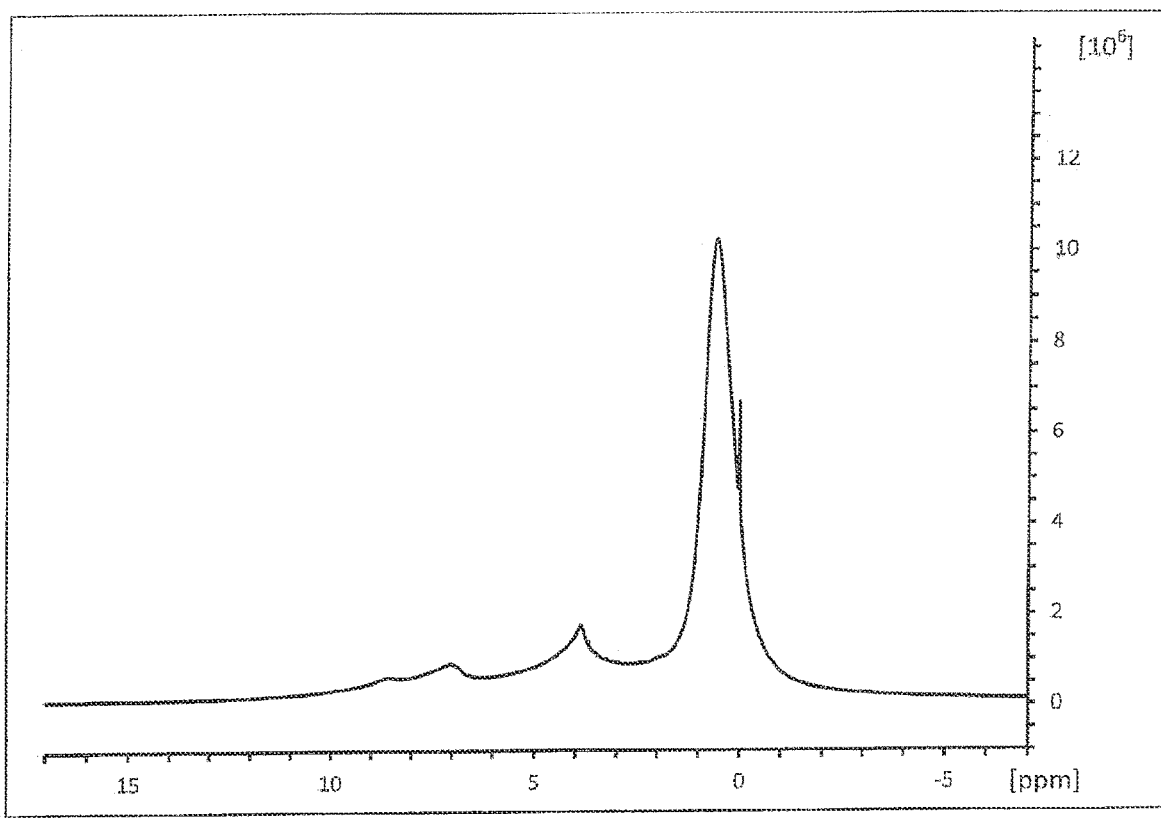
FIG. 2 shows a proton NMR spectrum of a composition according to the invention, carried out by means of a BRUKER® Avance 400® spectrometer.

The proton NMR spectrum (FIG. 2) of the mineral particles prepared makes it possible to identify the presence of the Hs of the Mg(OH) groups of the talc lamellae (chemical shifts between 0 and 1 ppm), the Hs of the imidazolium ring (chemical shifts between 6 ppm and 9 ppm) and of water (chemical shifts between 3 and 5 ppm).

Figure 3:
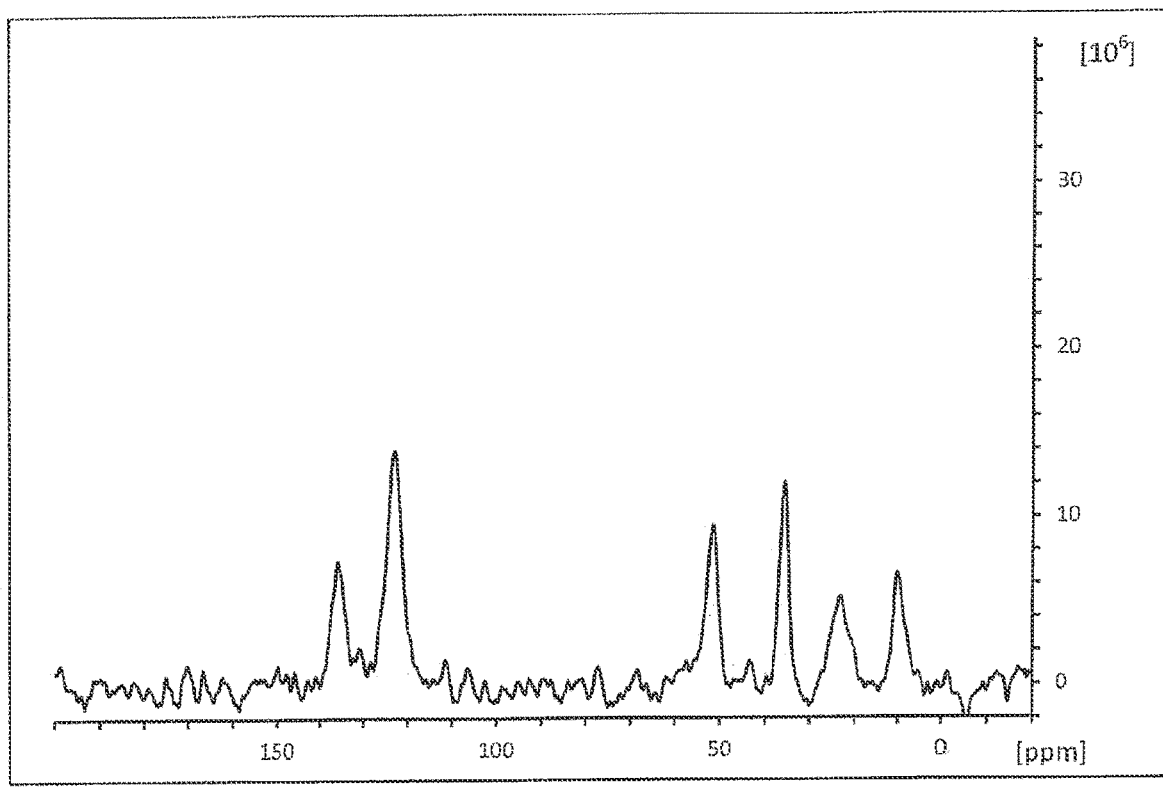
FIG. 3 shows a carbon NMR spectrum of a composition according to the invention, carried out by means of a BRUKER® Avance 400® spectrometer.

The carbon NMR spectrum (FIG. 3) of the mineral particles prepared makes it possible to identify the presence of an imidazolium group (chemical shifts between 115 ppm and 140 ppm) as well as the presence of a methyl group and of methylene groups (chemical shifts between 0 ppm and 60 ppm, including the methylene of the $CH_2$—Si bond between 9 ppm and 10 ppm).

Figure 4:
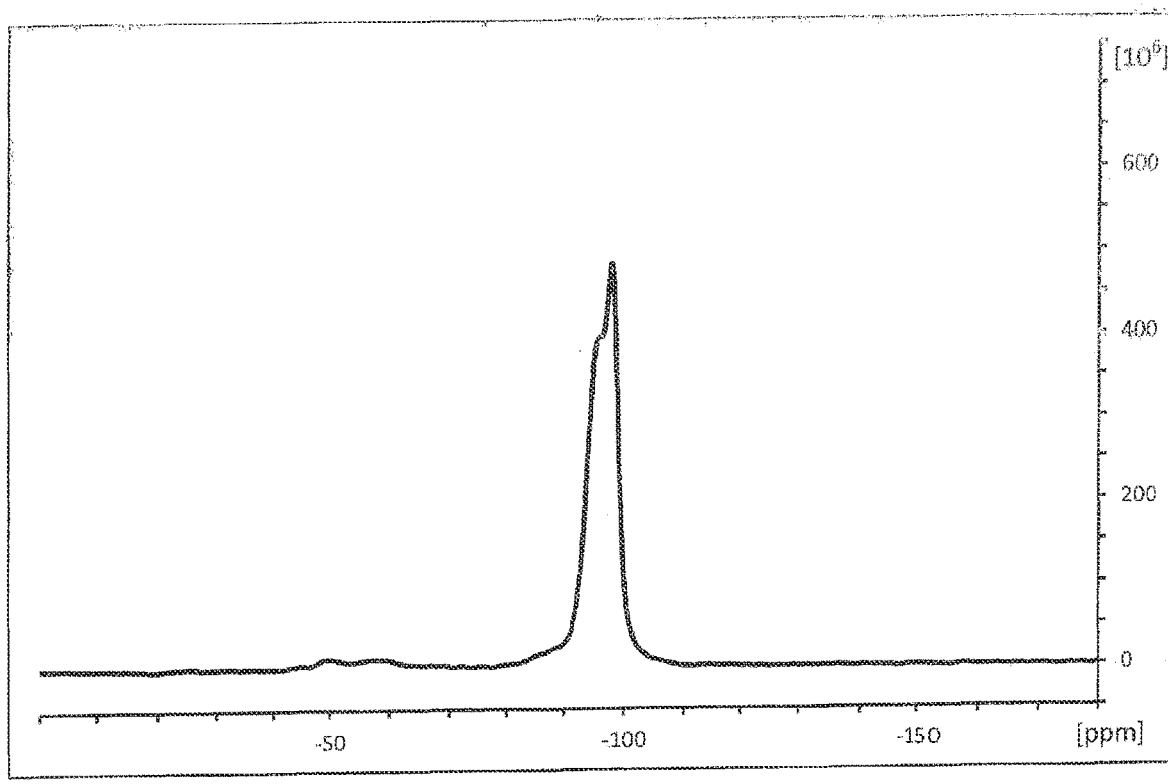
FIG. 4 shows a silicon NMR spectrum of a composition according to the invention, carried out by means of a BRUKER® Avance 400® spectrometer.

The silicon NMR spectrum (FIG. 4) of the mineral particles prepared makes it possible to identify the presence of Si—O—Si groups (chemical shifts between −80 ppm and −100 ppm).

The proton, carbon and silicon NMR spectra were obtained with a magnetic field of 9.4 tesla.

Figure 5:
FIG. 5 shows an image obtained by field effect scanning electron microscopy of a composition according to the invention.

FIG. 5 is an image obtained by field effect scanning electron microscopy (SEM-FEG) of the mineral particles prepared.

These analyses therefore show that the functionalisation of the talc is successfully carried out by the fixing of an oxysilane carrying an imidazolium group by covalent bonding with the talc. They are in particular bonds of the Si—O—Si type between a silicon atom of the talc and the silicon of the oxysilane. Furthermore, the functionalised talcose composition prepared by a method according to the invention comprises individualised and deagglomerated talc particles which have a very large specific surface area.

The invention can be the subject of many other applications and of different variants with respect to the embodiments and examples described above. In particular, other oxysilanes and oxygermanes can likewise be used as the functionalising agent for the phyllosilicate mineral particles.

The invention claimed is:

1. A method for preparing a composition comprising mineral particles functionalised by at least one organic group and having a specific surface area determined according to the BET method—standard AFNOR X 11—621 and 622—of greater than 500 m²/g, wherein:
choosing a phyllosilicate composition, comprising mineral particles belonging to the family of the lamellar silicates, said mineral particles selected from the group consisting of non-swelling 2:1 phyllosilicate, kaolinites, serpentinites, and chlorites having a thickness of less than 100 nm and a largest dimension of less than 10 µm;
choosing at least one compound comprising funtionalising agent from the group consisting of oxysilanes and oxygermanes having at least one organic group,
said phyllosilicate composition is brought into contact with a functionalising solution comprising the functionalising agent, so as to obtain a phyllosilicate composition comprising mineral particles functionalised by said organic group,
characterised in that the organic group is chosen from the group formed of cationic heteroaryl groups, and their salts, and in that said functionalising agent having the chemical formula:

wherein:
A denotes said organic group,
T is chosen from the group formed of silicon and germanium, and
R1, R2 and R3 are identical or different and are chosen from the group formed of hydrogen and linear alkyl groups containing from 1 to 3 carbon atom(s).

2. The method according to claim 1, characterized in that said chemical organic group is chosen from cationic heteroaryl groups comprising at least one aromatic ring having from 5 to 18 ring members, said aromatic ring containing at least one nitrogen atom.

3. The method according to claim 2, characterised in that said organic group has the chemical formula:

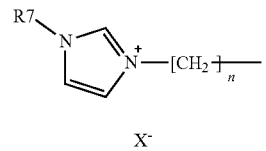

wherein:
R7 is chosen from linear or branched alkyl groups containing from 1 to 18 carbon atom(s),
n is an integer from 3 to 11,
$X^-$ is an anion selected from the group consisting of bromide ion, iodide ion, chloride ion, trifluoromethanesulfonate anion, acetate anion, nitrate anion and nitrite anion.

4. The method according to claim 3, characterised in that, after said phyllosilicate composition has been brought into contact with the functionalising solution, there is carried out an at least partial exchange of the anion $X^-$ by at least one anionic species which is different from $X^-$ and is selected from the group consisting of bromide ion, iodide ion, bis(trifluoromethanesulfonyl)amide anion, trifluoromethanesulfonate anion, hexafluorophosphate anion, tetrafluoroborate anion, acetate anion, nitrate anion and nitrite anion.

5. The method according to claim 3, characterised in that, after said phyllosilicate composition has been brought into contact with the functionalising solution, there is carried out an at least partial exchange of the anion $X^-$, when $X^-$ is selected from the group consisting of chlorine, bromine and iodine, by adding at least one silver salt.

6. The method according to claim 1, characterised in that said phyllosilicate composition comprises mineral particles having the chemical formula:

$$(Si_xGe_{1-x})_4 M_3O_{10}(OH)_2$$

Si denoting silicon,
Ge denoting germanium,
x being a real number of the interval [0;1], and
M denoting a metal.

7. The method according to claim 1, characterised in that said functionalising agent is chosen from the group formed of oxysilanes and oxygermanes which are soluble in an aqueous medium.

8. The method according to claim 1, characterised in that said functionalising solution is an aqueous solution.

9. The method according to claim 1, characterised in that said mineral particles comprise 2:1 phyllosilicates.

10. The method according to claim 1, characterised in that said mineral particles are prepared by a hydrothermal treatment of a hydrogel precursor containing silicon and/or germanium and a metal, said hydrogel precursor comprising particles of the formula $(Si_xGe_{1-x})_4 M_3 O_{11}, n'H_2O$, wherein:
- Si denotes silicon,
- Ge denotes germanium,
- x is a real number of the interval [0; 1],
- M denotes a metal atom,
- n' relates to a number of molecule(s) of water associated with said hydrogel.

11. The method according to claim 10, characterised in that the hydrogel precursor is prepared by a coprecipitation reaction between:
- at least one compound comprising silicon and/or germanium, such as sodium metasilicate or sodium metagermanate or also silicon, and
- at least one metal salt, so as to obtain a hydrated hydrogel precursor containing silicon and/or germanium and a metal comprising 4 silicon and/or germanium atoms for 3 atoms of at least one metal M.

* * * * *